(12) United States Patent
Fox

(10) Patent No.: US 8,559,330 B2
(45) Date of Patent: Oct. 15, 2013

(54) WIRELESS COMMUNICATION SYSTEM

(75) Inventor: Andrew John Fox, Wiltshire (GB)

(73) Assignee: Deltenna Limited (GB)

( * ) Notice: Subject to any disclaimer, the term of this patent is extended or adjusted under 35 U.S.C. 154(b) by 0 days.

(21) Appl. No.: 13/528,943

(22) Filed: Jun. 21, 2012

(65) Prior Publication Data

US 2012/0263113 A1 Oct. 18, 2012

Related U.S. Application Data

(63) Continuation of application No. 12/517,704, filed as application No. PCT/GB2007/004678 on Dec. 6, 2007, now abandoned.

(30) Foreign Application Priority Data

Dec. 6, 2006 (GB) .................................. 0624452.9

(51) Int. Cl.
*H04L 12/26* (2006.01)
(52) U.S. Cl.
USPC ......... 370/252; 370/431; 370/465; 455/562.1

(58) Field of Classification Search
USPC .......................... 370/252, 431, 465; 455/562.1
See application file for complete search history.

(56) References Cited

U.S. PATENT DOCUMENTS

| | | | |
|---|---|---|---|
| 2004/0114535 A1* | 6/2004 | Hoffmann et al. | 370/252 |
| 2005/0174974 A1* | 8/2005 | Sonntag et al. | 370/338 |
| 2006/0120395 A1* | 6/2006 | Xing et al. | 370/431 |
| 2007/0042717 A1* | 2/2007 | Alexiou et al. | 455/69 |

\* cited by examiner

*Primary Examiner* — Yemane Mesfin
*Assistant Examiner* — Wanda Z Russell
(74) *Attorney, Agent, or Firm* — Cantor Colburn LLP

(57) ABSTRACT

An access point allows access from at least one user device, which may be a wireless device or a wired local area network device. The access point has radio frequency transceiver circuitry for communicating over a wireless link with a base station selected from a plurality of available base stations, and an antenna, having an adjustable preferred direction for transmission and reception of radio frequency signals. Control circuitry selects a preferred direction for the antenna such that the access point can establish a wireless link with one of said base stations, based on a data rate that is available over the wireless link.

20 Claims, 4 Drawing Sheets

WIRELESS COMMUNICATION SYSTEM

CROSS REFERENCE TO RELATED APPLICATIONS

This application is a continuation of U.S. patent application Ser. No. 12/517,704 filed on 4 Jun. 2009 under 35 U.S.C. 371 as the U.S. national phase of International Patent Application Number PCT/GB2007/004678 filed on 6 Dec. 2007 which claims priority to Great Britain Patent Application Number 0624452.9 filed on 6 Dec. 2006, all of which said applications are herein incorporated by reference in their entirety.

TECHNICAL FIELD

This invention relates to a wireless communication system, and in particular to a wireless communication system including a wireless access point, having a wireless backhaul connection.

BRIEF DISCUSSION OF RELATED ART

Wireless access points are becoming common, allowing users of personal computers or other similar devices to establish a wireless connection with the access point. The access point then has a connection into a network, for example allowing the users of the personal computers to access the internet.

Data cards are also well known, and can be plugged into a personal computer or other device to allow that device to establish a connection over a cellular telephone network. The data cards therefore include suitable RF circuitry and suitable data processing circuitry to allow calls to be placed in the cellular telephone network. It is possible to plug such data cards into a wireless access point, so that the wireless access point has a wireless backhaul into the cellular telephone network, and then to any other device having a network connection. Data cards of this type typically have an omnidirectional antenna, potentially allowing them to establish connections to multiple base stations of the cellular telephone network.

When a device has the possibility to establish wireless links with a plurality of available base stations, it is recognized that it is usually preferable to establish the required link with the base station that provides the link with the best available signal to noise ratio, or meets some quality criterion.

BRIEF SUMMARY

However, the present invention proceeds from the recognition that, in some circumstances, the most important criterion is the data rate available over the selected wireless link.

According to a first aspect of the present invention, there is provided a method of operating an access point, wherein the access point is adapted to allow access from at least one user device, and wherein the access point comprises radio frequency transceiver circuitry for communicating over a wireless link with a base station selected from a plurality of available base stations, the method comprising: selecting said base station based on data rates available over wireless links with said plurality of available base stations.

According to a second aspect of the present invention, there is provided an access point, comprising: a first access interface, adapted to allow access from at least one user device; radio frequency transceiver circuitry for communicating over a wireless link with a base station selected from a plurality of available base stations; and control circuitry, for determining data rates available over wireless links with said plurality of available base stations.

This has the advantage that the access point can establish a wireless connection with a base station providing an acceptably high data rate, such that the access point can then provide a high data rate for the user devices connected thereto.

BRIEF DESCRIPTION OF THE DRAWINGS

For a better understanding of the present invention, and to show how it can be put into effect, reference will now be made, by way of example, to the accompanying drawings, in which.

DETAILED DESCRIPTION

Figure 1:
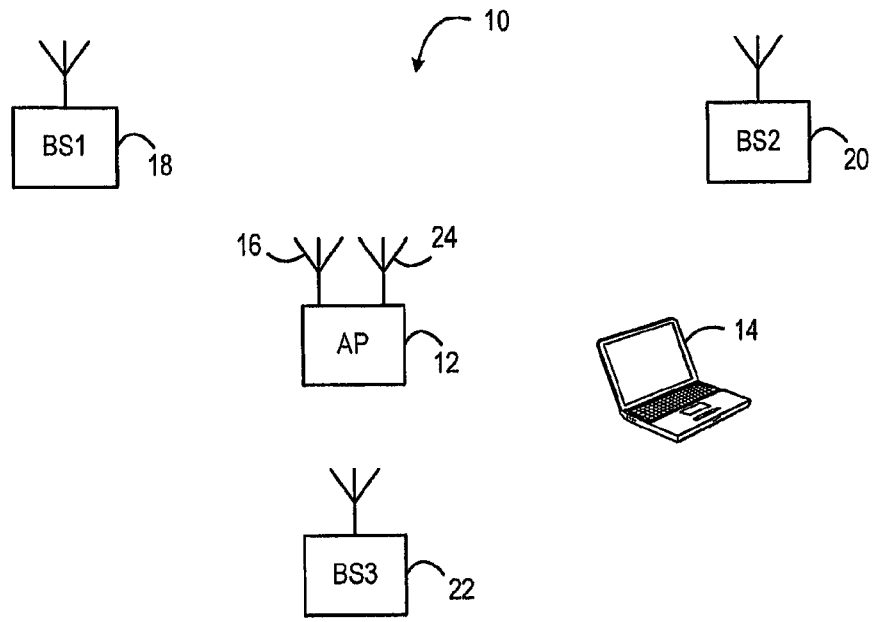
FIG. 1 is a block schematic diagram, illustrating a first wireless communication system in accordance with an aspect of the invention.

FIG. 1 shows a wireless communications environment 10, containing a wireless access point 12. The wireless access point 12 provides wireless access for a user of a suitably equipped mobile communications device 14, which may for example be a laptop computer, or another portable device. The wireless access point 12 can for example operate in accordance with one of the family of IEEE 802.11 standards, for example the standards commonly known as WiFi or WiMax. Alternatively, the wireless access point 12 can for example be a GSM pico base station, or any other base station or access point providing local area wireless coverage. For this purpose, the wireless access point 12 includes a first antenna 16, which may for example be an omnidirectional antenna.

The user of the mobile communications device 14, and other suitably equipped devices within the coverage area of the access point 12, can then transfer data to and from the access point 12. In order for the user of the mobile communications device 14 to be able to communicate with other users, or to be able to download data, for example from websites, the access point 12 needs to have a connection over a suitable network.

In the example shown in FIG. 1, the wireless access point 12 is located in a wireless communications environment 10, which is typical of many urban areas, in that the wireless access point 12 is located in the coverage areas of a number of cellular base stations, in this case a first base station (BS1) 18, a second base station (BS2) 20 and a third base station (BS3) 22. As is well known, each of these cellular base stations 18, 20, 22 has a connection into the Public Switched Telephone Network (PSTN) (not shown), or into a packet data network, allowing it to establish voice and data calls to and from users of mobile phones and other suitably equipped mobile communications devices within their respective coverage areas.

In accordance with the invention, the access point 12 is provided with a suitable antenna 24, and radio frequency communications circuitry (not shown in FIG. 1), allowing it to establish a connection with some or all of the cellular base stations 18, 20, 22. By establishing a connection with one of the cellular base stations, the access point 12 is able to transfer data between the user 14 and a location accessible over the PSTN. For example, the access point can establish a connection between the user 14 and a website to allow the user 14 to download content from the website. Thus, the access point 12 uses the respective cellular network to provide backhaul for its data. As another illustrative example, the user device may be a VoIP (Voice over IP [Internet Protocol]) phone, establishing an IP connection through the access point 12, with backhaul over the cellular network, to another VoIP phone having an internet connection.

Figure 2:
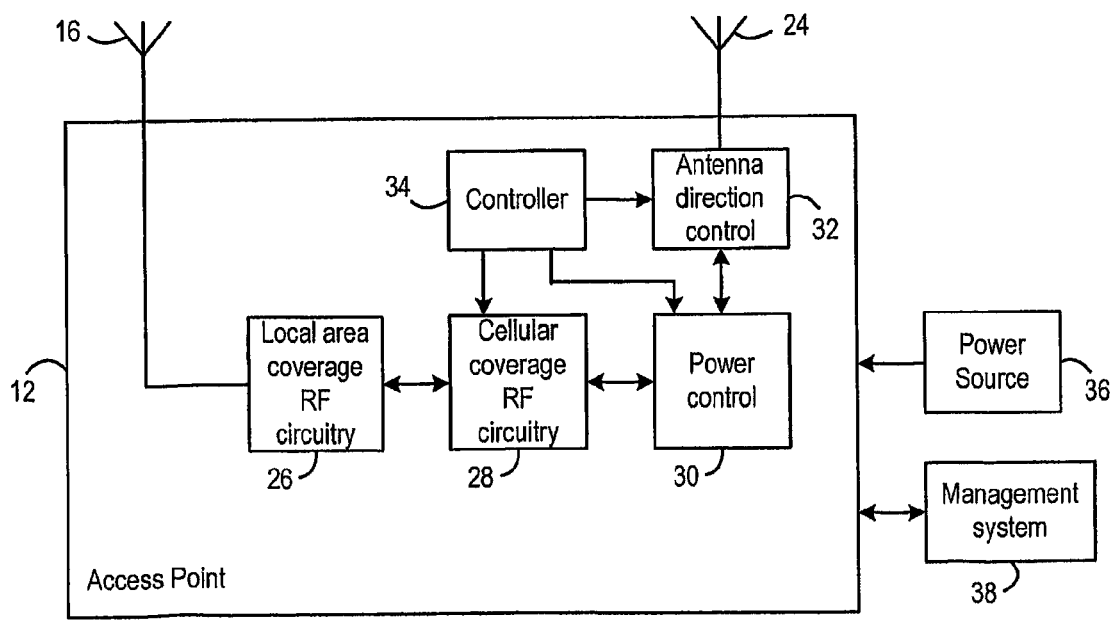
FIG. 2 is a more detailed block schematic diagram of an access point in the system of FIG. 1.

FIG. 2 is a schematic diagram, illustrating in more detail the form of the access point 12. As mentioned previously, the access point 12 has a first antenna 16, for communication with users of suitably equipped mobile communications devices, in accordance with one of the family of IEEE 802.11 standards, and the antenna 16, may for example be an omnidirectional antenna to allow communication with suitably equipped mobile communications devices in the whole area around the access point 12.

The antenna 16 is connected to local area coverage RF circuitry 26, as would conventionally be found in an access point operating in accordance with that standard. For example, where the access point 12 operates in accordance with one of the family of IEEE 802.11 standards, the local area coverage RF circuitry 26 is able to convert received signals into the appropriate data stream, and is able to convert incoming data into signals suitable for transmission over the wireless interface in accordance with that standard.

The local area coverage RF circuitry 26 is connected to cellular coverage RF circuitry 28, as would conventionally be found in a mobile communications device suitable for operating in accordance with the relevant standard or standards. For example, where the access point 12 is intended to establish a connection with a cellular base station (for example, one of the base stations 18, 20, 22) operating in accordance with the GSM standard, then the cellular coverage RF circuitry 28 includes appropriate GSM circuitry. Similarly, where the access point 12 is also intended to establish a connection with a cellular base station (for example, one of the base stations 18, 20, 22) operating in accordance with the UMTS standard, then the cellular coverage RF circuitry 28 also includes appropriate UMTS circuitry.

In this illustrated embodiment of the invention, the cellular coverage RF circuitry 28 is connected to power control circuitry 30, as will be described in more detail below.

The power control circuitry 30 is connected to antenna direction control circuitry 32, which in turn is connected to the cellular antenna 24.

The cellular coverage RF circuitry 28, the power control circuitry 30, and the antenna direction control circuitry 32 operate under the control of a controller 34.

The access point 12 receives electrical power from a power source 36. The power source 36 may be a mains electrical power source, or an electrochemical battery, or may be a power source deriving energy from its environment, such as a solar power source, or a wind power source, or combined wind/solar power source.

The access point 12 operates under the control of a management system 38. The management system 38 can be provided on a remote computer, and can control the operation of the access point 12. For example, the management system 38 can be connected to the access point 12 over an existing local area network (LAN), or may be wirelessly connected to the access point 12, for example allowing the remote management system 38 to configure the link via ftp, or via a website provided for that purpose. The management system 38 can then, for example, control the security of the access point, determining which user devices are permitted to establish connections thereto.

Figure 3:
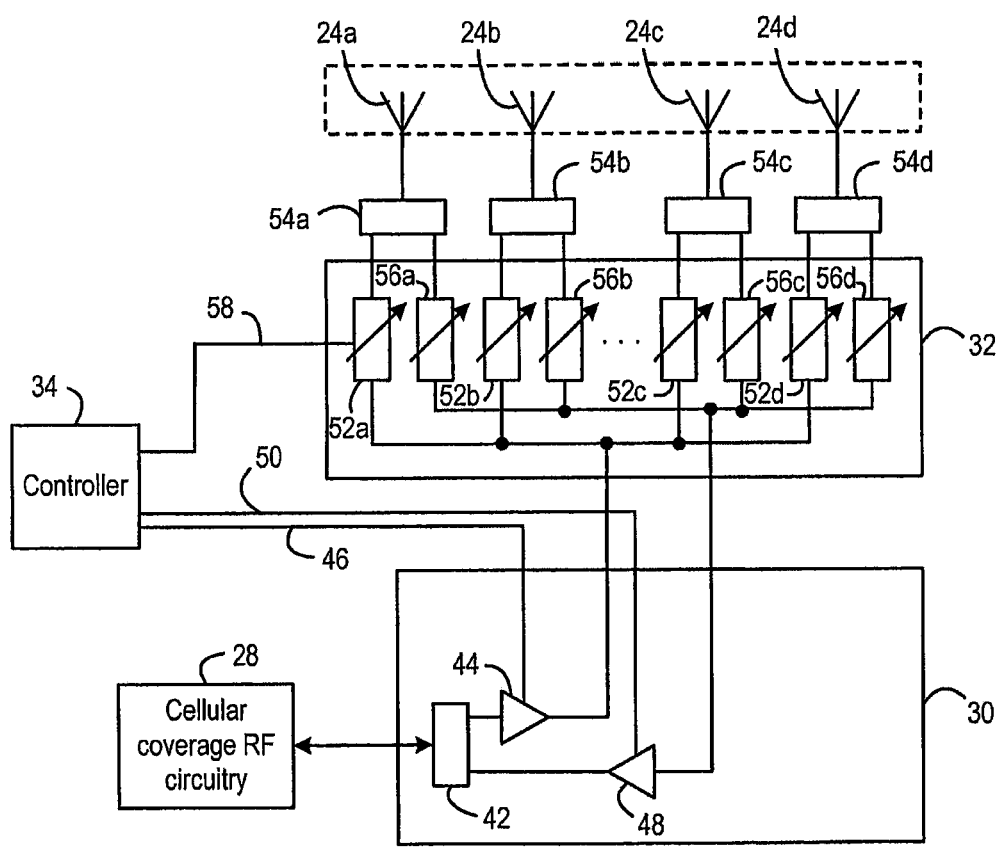
FIG. 3 is a more detailed block schematic diagram of a part of the access point of FIG. 2.

FIG. 3 is a more detailed block schematic diagram of a part of the access point 12. Specifically, FIG. 3 shows in more detail the cellular coverage RF circuitry 28, the power control circuitry 30, the antenna direction control circuitry 32, and the cellular antenna 24.

As shown in FIG. 3, the antenna 24 includes four antenna elements 24a, 24b, 24c, 24d, although it will be appreciated that any convenient number of antenna elements can be provided. In particular, an antenna with eight antenna elements may be particularly suitable for this implementation. Each of these antenna elements 24a, 24b, 24c, 24d is directional. That is, each of the antenna elements 24a, 24b, 24c, 24d transmits signals preferentially in one direction, in azimuth, and is most sensitive to received signals from the same direction. These preferential directions are preferably all different, and are equally spaced around the azimuth, such that the antenna 24 is essentially omnidirectional. However, it is also possible for the antenna 24 to be formed of antenna elements whose preferential directions are not equally spaced in this way, with the result that the antenna 24 will not be omnidirectional, but will be at least somewhat directional.

As mentioned above, the cellular coverage RF circuitry 28 is connected to power control circuitry 30, which is shown in more detail in FIG. 3. Specifically, the power control circuitry 30 includes a duplexer 42, for separating and combining signals at the RF transmit and receive frequencies in the relevant cellular networks.

Thus, transmit signals from the cellular coverage RF circuitry 28 pass through the duplexer 42 to a power amplifier 44, before being passed to the antenna direction control circuitry 32. The power amplifier is provided in order to be able to amplify the signals more than would usually be the case in a cellular user equipment, thereby allowing the access point to establish a connection to a cellular base station (for example one of the base stations 18, 20, 22, shown in FIG. 1) that is more distant than the base station that a cellular base station would conventionally access. The degree of amplification provided by the power amplifier 44 is determined by the controller 34 by means of a signal passed along a control line 46.

Somewhat similarly, received signals from the antenna 24 and the antenna direction control circuitry 32 pass through a low noise amplifier 48, before being passed through the duplexer 42 to the cellular coverage RF circuitry 28. The low noise amplifier 48 is provided in order to be able to amplify the signals more than would usually be the case in a cellular user equipment, thereby allowing the access point to establish a connection to a cellular base station (for example one of the base stations 18, 20, 22, shown in FIG. 1) that is more distant than the base station that a cellular base station would conventionally access. The degree of amplification provided by the low noise amplifier 48 is determined by the controller 34 by means of a signal passed along a control line 50.

After passing through the power amplifier 44, the transmit signals are divided, and passed through respective gain control elements, in this case controllable attenuators 52a, 52b, 52c, 52d, and through respective duplexers 54a, 54b, 54c, 54d to the respective antenna elements 24a, 24b, 24c, 24d.

Somewhat similarly, received signals from the antenna elements 24a, 24b, 24c, 24d pass through the respective duplexers 54a, 54b, 54c, 54d to respective gain control elements, in this case controllable attenuators 56a, 56b, 56c, 56d, before being combined and passed to the low noise amplifier 48.

The degree of attenuation provided by each of the controllable attenuators 52a, 52b, 52c, 52d, and 56a, 56b, 56c, 56d is determined by the controller 34 by means of signals passed along a control line, or lines, 58.

Thus, by controlling the degree of attenuation in each of the signal paths to and from the antenna elements 24a, 24b, 24c, 24d, the effective beam shape of the antenna 24 can be altered. That is, if each of the controllable attenuators 52a, 52b, 52c, 52d, and 56a, 56b, 56c, 56d provides an equal degree of attenuation, or provides no attenuation at all, the antenna elements 24a, 24b, 24c, 24d transmit signals with equal amplitudes, and are equally sensitive to received signals, and so, depending on the respective preferred directions of the antenna elements 24a, 24b, 24c, 24d, the antenna 24 may be effectively omnidirectional.

By contrast, if the signals in the signal paths to and from one of the antenna elements 24a, 24b, 24c, 24d are not attenuated, or are only slightly attenuated, while the signals in the signal paths to and from the other antenna elements 24a, 24b, 24c, 24d are strongly attenuated, the effective beam shape of the antenna 24 strongly resembles the beam shape provided by the antenna element whose signals are not attenuated, or are only slightly attenuated.

That is, by suitable control of the controllable attenuators 52a, 52b, 52c, 52d, and 56a, 56b, 56c, 56d the antenna 24 can be made to be highly directional.

Usually, the controllable attenuators 52a, 52b, 52c, 52d, and 56a, 56b, 56c, 56d are controlled such that the attenuators of the pairs 52a, 56a; 52b, 56b; 52c, 56c; and 52d, 56d in the signal paths to and from the respective antenna elements 24a, 24b, 24c, 24d are controlled in the same way, such that the antenna 24 has the same beam shape and size in the uplink path as in the downlink path, but this need not necessarily be the case.

Although the invention is illustrated above with reference to an embodiment in which controllable attenuators are located in the signal paths to and from the antenna elements, it is equally possible to provide a beam switched antenna, with switches provided, for switching the respective antenna elements into and out of the signal paths. Thus, by switching only one or a small number of the antenna elements into the signal paths, the antenna 24 can be made highly directional.

Further, the antenna may alternatively include only a small number of antenna elements, such that they form a directional antenna, with means being provided (for example, a mechanical rotational device) for altering the direction of the antenna.

Controlling the antenna 24 such that it becomes somewhat directional has the further advantage that the transmission paths from the access point 12 to one of the cellular base stations, and from the cellular base station to the access point 12 become much less affected by multipath transmissions. For example, to illustrate this, if the antenna 24 of an access point 12 is made directional, with its preferred direction pointing towards the cellular base station with which it has established a connection, the access point is less likely to be affected by reflections of the signals transmitted from the cellular base station, because these reflections are likely to be arriving from a direction that is different from the preferred direction.

Figure 4:
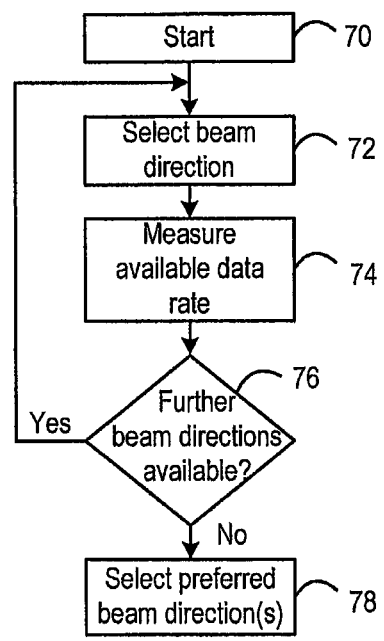
FIG. 4 is a flow chart, illustrating a method of operation of the access point on FIG. 2, in accordance with a further aspect of the invention.

FIG. 4 is a flow chart, illustrating a process in accordance with an aspect of the invention. The process starts at step 70, and passes to step 72, in which a beam direction is selected. As discussed above, different beam directions can be selected by appropriate control of the controllable attenuators 52a, 52b, 52c, 52d, and 56a, 56b, 56c, 56d in the signal paths to and from the respective antenna elements 24a, 24b, 24c, 24d. For example, beam directions resembling the preferred directions of the antenna elements 24a, 24b, 24c, 24d can be selected in turn by choosing not to attenuate the signals in the signal paths to and from those antenna elements in turn.

Where the antenna is a beam switched antenna, different beam directions can be selected in turn by switching the different antenna elements into the signal paths in turn. Where the antenna is a rotatable directional antenna, different beam directions can be selected in turn by rotating the antenna.

In step 74, it is determined whether the access point 12 can establish a connection into a cellular network at the selected beam direction, with an acceptable signal quality. If so, the data rate available over that connection is measured and stored. For example, referring back to FIG. 1, even though the three base stations 18, 20, 22 may all be provided by a single mobile network operator, they may be different types of base station. For example, one may be a GSM base station, one may be a UMTS base station, and one may be a UMTS base station that allows High Speed Uplink Packet Access (HSUPA), or High Speed Downlink Packet Access (HSDPA), or both. In that case, the UMTS base station allowing HSUPA or HSDPA will allow a higher data rate than the UMTS base station not allowing HSUPA or HSDPA, though the latter will still allow a higher data rate than the GSM base station.

The access point 12 potentially needs a high data rate connection for its backhaul requirements in order to provide high usable data rates for users such as the user 14, for example when the user 14 is using an internet connection, for example for a VoIP phone call. In such situations, it is advantageous for the access point 12 to be able to ensure that it can establish a connection to a base station that can provide a suitably high data rate connection.

By contrast, the cellular network containing the base stations 18, 20, 22 will generally be set up such that, when the access point 12 registers within the cellular network, a connection will be established with the base station that can provide the highest quality link, for example based on signal to noise ratio measurements. Typically, however, the access point 12 would be able to establish acceptably high quality connections with several of the surrounding base stations.

Thus, in step 74, causing the antenna 24 of the access point 12 to become relatively highly directional constrains its ability to establish connections with the surrounding base stations. For each possible direction, the access point 12 may only be able to establish a connection with one of the surrounding base stations, and so the data rate over that connection can be measured.

In step 76, it is determined whether all of the possible beam directions have been tested. If not, the process returns to step 72, and continues until all of the possible beam directions have been tested. When this occurs, the process passes to step 78, in which one of the beam directions is selected. In one embodiment of the invention, software provided in the controller 34 selects the beam direction in which the highest data rate is available. In other embodiments of the invention, the controller 34 may select a beam direction, from amongst multiple beam directions providing acceptably high data rates, based on other criteria. In other embodiments, the controller 34 provides to a user, or to the management system 38, information about the available date rates based on the possible beam directions, and a suitable beam direction can then be selected.

Thus, by altering the beam direction, the access point 12 effectively forces the cellular network to establish a connection between the access point 12 and a particular cellular base station, based on the requirements of the access point 12.

In one embodiment of the invention, the controller 34 also selects an alternative beam direction, that can be used to provide a connection to an alternative cellular base station, for use in the event that the connection to the first selected base station fails for any reason.

This selection of an alternative beam direction can be performed in the case of a beam definable antenna, or in the case of a beam switched antenna. In either case, the alternative beam direction is kept active, even while the first selected beam direction is in use.

As mentioned above, the controller 34 can also boost the power of transmitted and received signals by means of the power control circuitry 30, in order to make it possible for the access point 12 to establish connections to cellular base stations, even though the access point 12 may not be within the normal coverage areas of those cells.

Figure 5:
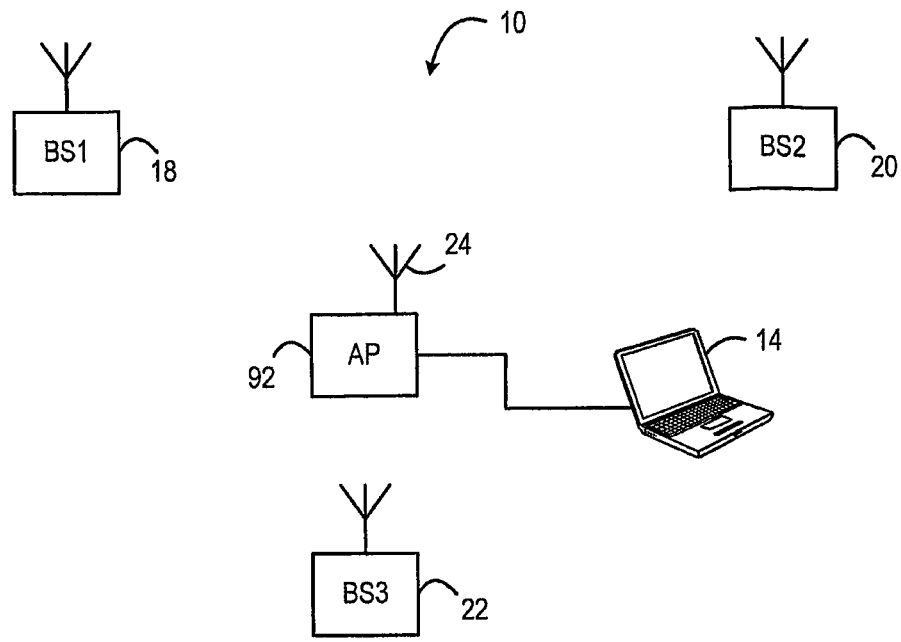
FIG. 5 is a block schematic diagram, illustrating a second communication system in accordance with an aspect of the invention.

FIG. 5 is a block schematic diagram of an alternative communications system in accordance with an aspect of the invention. In this system, there is again provided an access point 92 located in a wireless communications environment 10, and specifically located in the coverage areas of a first base station (BS1) 18, a second base station (BS2) 20 and a third base station (BS3) 22, forming part of one or more cellular telephone networks.

In accordance with the invention, the access point 12 is provided with a suitable antenna 24, and radio frequency communications circuitry allowing it to establish a connection with some or all of the cellular base stations 18, 20, 22.

Figure 6:
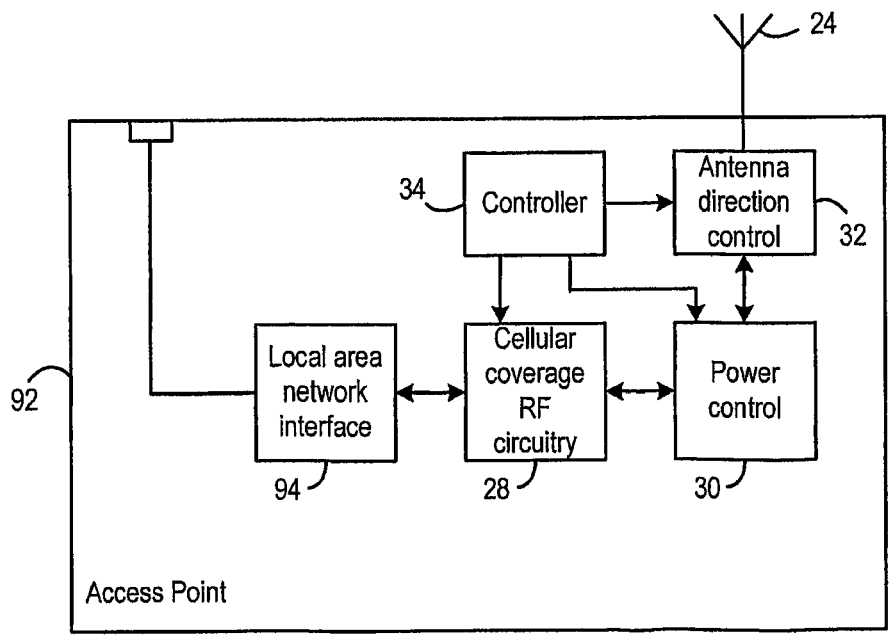
FIG. 6 is a more detailed block schematic diagram of an access point in the system of FIG. 5.

FIG. 6 is a more detailed block schematic diagram showing the form of the access point 92. Specifically, the access point 92 includes a local area network interface 94, which may for example be an Ethernet interface, allowing one or more computers 14 or other devices to establish a connection thereto. The connections of the computers may be wired or wireless. The local area network interface 94 is connected to cellular coverage RF circuitry 28, power control circuitry 30, antenna direction control circuitry 32, and a cellular antenna 24, all of which are as described above with reference to FIG. 2 and FIG. 3, and therefore will not be described in more detail. In this case, the functionality of the access point 92 can simply be provided in a personal computer, for example the computer 14, which therefore may not be a portable device.

In accordance with an aspect of the invention, the access point 92 performs a process as shown in, and described with reference to, FIG. 4, in order to provide backhaul for data that the user of the computer 14 wishes to communicate through the access point 92.

In a preferred embodiment, the cellular coverage RF circuitry 28 is provided on a data card, for example such as a so-called 3G data card. As is known, such a data card can conventionally be inserted into a mobile device, such as a portable computer, in order to allow a user of the portable computer to communicate over the relevant cellular network. In this case, the data card can be inserted into the access point 12, or the access point 92, in order to allow a user of a device having a wireless or wired connection into the access point to communicate over the relevant cellular network.

There is thus provided a system in which a cellular network can be used to provide a high data rate service for an access point at a particular location, even though the cellular network would not normally provide a high data rate service to a user at that location.

The invention claimed is:

1. A method of operating a wireless cellular access point in electrical communication with a cellular network configured to allow access from at least one user device, the method comprising:
   (a) determining a set of acceptable cellular base stations by establishing a connection with at least one cellular base station among a plurality of cellular base stations, for a first protocol of operation;
   (b) for each cellular base station where a connection is established, determining the available data rate for the connection in a first protocol of operation;
   (c) repeating steps described in (a) and (b) for another protocol of operation in response to the cellular network and the cellular access point jointly supporting more than one protocol of operation;
   (d) selecting the cellular base station based on a metric that takes into account data rates available over the wireless links corresponding to the plurality of cellular base stations;
   (e) periodically repeating steps (a)-(d) during operation;
   (f) communicating over a wireless link with a cellular base station selected from a plurality of available cellular base stations by a cellular access point; and
   (g) operating the cellular access point such that an antenna adjusted in a preferred direction that is selected based on a data rate that is then available over the wireless link with a selected cellular base station.

2. A method as claimed in claim 1, wherein the cellular access point allows access from at least one user device over a second wireless link.

3. A method as claimed in claim 2, wherein the cellular access point allows access from at least one user device over a WiFi link.

4. A method as claimed in claim 2, wherein the cellular access point allows access from at least one user device over a WiMax link.

5. A method as claimed in claim 1, wherein the cellular access point allows access from at least one user device over a wired local area network.

6. A method as claimed in claim 1, comprising automatically selecting said cellular base station.

7. A method as claimed in claim 6, comprising automatically selecting said cellular base station as the cellular base station providing the highest available data rate over its respective wireless link.

8. A method as claimed in claim 1, comprising: sequentially determining an available data rate associated with each of a plurality of possible antenna beam directions; and selecting a beam direction for future use, based on said available data rates.

9. A method as claimed in claim 1, comprising: in an initial phase, operating the cellular access point such that the antenna has a plurality of preferred directions in turn; and for each of said preferred directions, determining an available data rate over a wireless link that can be established.

10. The method of claim 1, wherein the determining an acceptable cellular base station further comprises forcing a two-way connection with a first cellular base station selected from the plurality of cellular base stations based on requirements of the cellular access point.

11. An access point in electrical communication with a cellular network, the access point comprising:
   a first access interface, that provides access from at least one user device communicating with the cellular;
   radio frequency transceiver circuitry to determine (a) a set of acceptable cellular base stations by establishing a connection with at least one cellular base station among a plurality of cellular base stations, for a first protocol of operation, and (b) to determine an available data rate of the connection in a first protocol of operation for each cellular base station where a connection is established, the radio frequency transceiver circuitry repeating operations described in operations (a) and (b) for another protocol of operation in response to the cellular network and the cellular access point jointly supporting more than one protocol of operation; and base station control circuitry, to select the cellular base station based on a metric that takes into account data rates available over the wireless links corresponding to the plurality of cellular base stations;

radio frequency transceiver circuitry that communicates over a wireless link with a cellular base station selected from a plurality of available cellular base stations;

an antenna, having an adjustable preferred direction for transmission and reception of radio frequency signals; and beam direction control circuitry, that selects preferred direction for the antenna such that the cellular access point can establish a wireless link with one of the cellular base stations, based on a data rate that is available over the wireless link, wherein the radio frequency transceiver circuitry repeats each of operation (a) including the determining a set of acceptable cellular base stations and operation (b) including the determining available data rate of the connection for another protocol of operation in response to the cellular network and the cellular access point jointly supporting more than one protocol of operation, and wherein the operations of the radio frequency circuitry and the base station control circuitry are periodically repeated during operation.

12. A cellular access point as claimed in claim 11, wherein the antenna has a plurality of antenna elements; and the beam direction control circuitry, includes variable amplitude adjustment devices in each of a plurality of signal paths associated with said antenna elements.

13. A cellular access point as claimed in claim 12, wherein said base station control circuitry determines data rates available over wireless links with one or more of said plurality of available cellular base stations by controlling said beam direction control circuitry to adjust a direction of a beam of said antenna, and successively determine data rates available over wireless links at said beam directions.

14. A cellular access point as claimed in claim 12, wherein said cellular access point is configured to automatically selects a beam direction of said antenna, in order to obtain a wireless link with one of said plurality of available cellular base stations, having an acceptable data rate.

15. A cellular access point as claimed in claim 14, wherein said cellular access point is further configured to automatically select a second beam direction of said antenna, in order to obtain a reserve wireless link with another of said plurality of available cellular base stations.

16. A cellular access point as claimed in claim 11, comprising: an antenna, having a plurality of antenna elements; and the beam direction control circuitry switches respective antenna elements into and out of a plurality of signal paths associated with said antenna elements.

17. A cellular access point as claimed in claim 16, wherein at least two of said antenna elements can be switched into the respective signal paths at the same time, while at least one other antenna element is switched out of the respective signal path.

18. A cellular access point as claimed in claim 11, wherein the first access interface accesses from a user device to make a VoIP phone call.

19. A cellular access point as claimed in claim 11, having a solar power source.

20. A cellular access point as claimed in claim 11, having a wind power source.

* * * * *